(12) United States Patent
Yarbrough et al.

(10) Patent No.: US 8,903,751 B1
(45) Date of Patent: Dec. 2, 2014

(54) DETECTING PARTICIPANT HELPFULNESS IN COMMUNICATIONS

(75) Inventors: Brandon Yarbrough, Seattle, WA (US); Manish Katyal, Seattle, WA (US); Gregory Miller, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 474 days.

(21) Appl. No.: 13/015,960

(22) Filed: Jan. 28, 2011

(51) Int. Cl.
G06F 15/18 (2006.01)

(52) U.S. Cl.
USPC .......................................................... 706/20

(58) Field of Classification Search
CPC ......................... H04M 1/72552; G06Q 10/107
USPC .......................................................... 706/20
See application file for complete search history.

(56) References Cited

U.S. PATENT DOCUMENTS

| | | | |
|---|---|---|---|
| 7,185,108 B1 * | 2/2007 | Okachi | 709/240 |
| 7,814,048 B2 * | 10/2010 | Zhou et al. | 707/602 |
| 8,185,482 B2 * | 5/2012 | Yang et al. | 706/12 |
| 2006/0112036 A1 * | 5/2006 | Zhang et al. | 706/20 |
| 2006/0197748 A1 * | 9/2006 | Hatch | 345/169 |
| 2010/0063880 A1 * | 3/2010 | Atsmon et al. | 705/14.53 |
| 2013/0132277 A1 * | 5/2013 | Naqvi | 705/44 |

* cited by examiner

*Primary Examiner* — Kakali Chaki
*Assistant Examiner* — Michael Zidanic
(74) *Attorney, Agent, or Firm* — Thomas|Horstemeyer, LLP

(57) ABSTRACT

Methods, systems and computer program products are provided. Methods for detecting helpful query responses include generating helpfulness terminology data corresponding to words, terms, phrases and/or symbols that correspond to an expression of helpfulness. A query based exchange including multiple messages is identified. The messages are analyzed using the helpfulness terminology data to detect a helpful message. The helpful message is associated with a source participant and a helpfulness value that corresponds to the source participant is modified. A value corresponding to the query based exchange indicating that the query based exchange was successful is stored.

23 Claims, 9 Drawing Sheets ered minutes, hours, days, months or even years after the initial message. In some cases, such communications may provide commercial value. Such cases may include the provision of services and/or information either by a service provider or about a service provider. Unfortunately, it may be difficult to identify participants that may provide valuable communications.

DETECTING PARTICIPANT HELPFULNESS IN COMMUNICATIONS

BACKGROUND

Electronic communications have become widely accepted for communicating among people and/or groups of people. Such electronic communications may include real-time communications such as telephonic and online chat sessions as well as non-real-time communications such as email, text messages and bulletin board type postings where responses to messages may be received minutes, hours, days, months or even years after the initial message. In some cases, such communications may provide commercial value. Such cases may include the provision of services and/or information either by a service provider or about a service provider. Unfortunately, it may be difficult to identify participants that may provide valuable communications.

DETAILED DESCRIPTION

Figure 1:
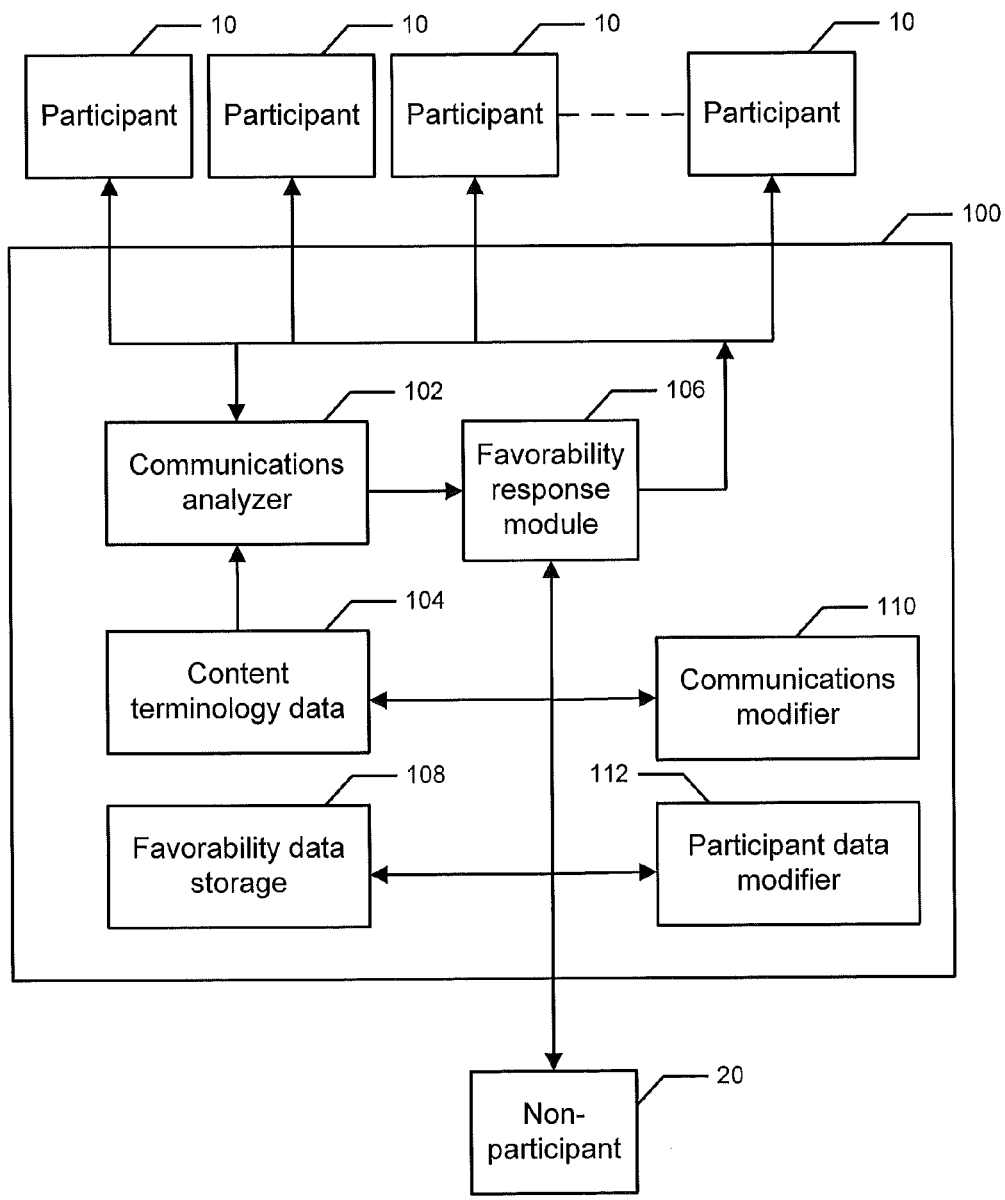
FIG. 1 is a block diagram of systems, devices, methods and computer program products for detecting favorability in communications, according to various embodiments described herein.

Various embodiments described herein analyze communications between multiple participants to detect helpful messages in response to a query. For example, a computer-based resource such as a weblog, online bulletin board, and/or online forum may provide a communications environment where participants may post comments and/or questions. Other participants may respond to questions, for example, with comments, answers and/or requests for additional information regarding the comment or question. In some circumstances, a reply to a question may be particularly helpful and thus may elicit an expression of gratitude for the helpful message.

In this regard, expressions of gratitude may be used to identify the helpful message. For example, a message including "Thanks" or some other similar indication of gratitude may be used to detect a helpful message. Additionally, responses to expressions of gratitude may be used to identify the helpful message. For example, a message including gratitude response language such as "Your Welcome" may also be used to detect and/or confirm detection of a helpful message.

Additionally, some expressions indicating a helpful message may be less well-known or less overt in communicating gratitude. In this regard, helpfulness terminology data may be generated using initial messages and/or a training data set. The helpfulness terminology data may include a library of helpfulness and/or gratitude terminology. The helpfulness terminology data may also include a computer-implemented intelligent agent that may be based on evolutionary computation concepts such as artificial intelligence and/or neural networks among others.

The helpfulness terminology data may be dynamic in that it may be continually updated using subsequently identified helpful message related content. In this manner, as the language evolves to use different slang or colloquial terms to express gratitude and/or helpfulness, the helpfulness terminology data may be updated to be current. Additionally, some communications environments may be used primarily by persons having the same social, recreational and/or professional interests that form a community of common interests. Such communities may develop certain community unique terms for indicating helpfulness and/or gratitude. Helpfulness terminology data may be updated to include such community unique terms to detect the helpful message.

In addition to analyzing useful message content to supplement helpfulness terminology data, a helpful message may be associated with the source participant thereof. As used herein, a source participant may include a participant in a communications environment that is identified as being a source, originator and/or sender of at least one message including content that is identified as being helpful and/or is responded to using terminology expressing appreciation and/or gratitude. For example, a helpfulness value may be modified, increased and/or incremented to reflect that the source of the message was helpful regarding the query. Content of the exchange and/or messages therein may be analyzed to determine a general subject of the query. In this manner, the helpfulness value may be modified to reflect that the source participant was helpful pertaining to a specific subject matter. By including content specific data, different participants may become associated as being helpful in different respective areas of interest.

Once participants are associated with helpful messages regarding specific subjects, message routing may be modified to be directed to specific participants that are associated as having been previously helpful regarding those subjects.

Although discussed heretofor in terms of helpful messages, particularly unhelpful messages may also be identified. In this regard, helpfulness data associated with a source participant of the particularly unhelpful message may be modified to indicate the unhelpfulness. Once a participant is identified as unhelpful in a particular area, future messages may be expressly not sent to that participant.

Overall Architecture

Reference is now made to FIG. 1, which is a block diagram of systems, devices, methods and computer program products for detecting favorability in communications, according to various embodiments described herein. A communications environment 100 may facilitate communications between multiple participants 10. In some embodiments, the communications environment 100 may include a computer-based resource such as a weblog, online bulletin board, and/or online forum for participants to post comments and/or questions. In some embodiments, communications provided by any participant 10 may be accessed, accessible and/or transmitted to one or more other participants 10.

Some embodiments provide that the communications environment 100 may provide point-to-point communications between specific participants 10, such as, for example, those used between a client or customer and a service provider. Examples of such arrangements include, but are not limited to a customer service role, a technical support role, and/or a concierge service, among others. In this regard, the communications environment 100 may include text based communications via one or more computing devices and/or voice based communications using a variety of telephony equipment that may be routed through, coupled with and/or monitored by the communications environment 100. In the case of voice communications, some embodiments may further include a voice to text converter (not shown) and/or a voice content analyzer to determine content of the communications.

The communications environment 100 may include a communication analyzer 102 that is configured to identify a communications exchange that includes a query or other opportunity for another participant to provide a helpful response. Some embodiments provide that the communications analyzer 102 may be configured to convert communications data from a first data format and/or type to a second data format and/or type. For example, as discussed above, voice communications may be converted to text.

Some embodiments provide that the communications analyzer 102 may be configured to identify indications of favorable communications and/or helpful messages. For example, a participant 10 may post a query such as "Where is the best place to get coffee in Topeka?" The communications analyzer 102 may identify the message as an initiating message in a query based exchange based on the question mark or the term "Where" at the beginning of a sentence. A variety of responses to the question may be provided by other participants 10. In the case of a particularly helpful response, the initiating participant 10 may send and/or post a message expressing appreciation and/or gratitude for the helpful message, such as, for example, "Thank you" or "Thanks". The communication analyzer 102 may identify the helpful response by virtue of the message expressing the appreciation and/or gratitude. Additionally, in response to the gratitude message, the participant 10 providing the helpful message may send a message that includes, for example, "You're welcome." In this regard, the communications analyzer 102 may identify the helpful message via the response to gratitude.

Some embodiments provide that the communications analyzer 102 may be configured to identify messages and/or exchanges that indicate and/or suggest an unfavorable experience, process, exchange, and/or message In some embodiments, the communications analyzer 102 may use content terminology data 104 to identify query based exchanges and/or helpful messages. Some embodiments provide that the content terminology data 104 may include a content terminology library that is configured to include words, terms, phrases and/or symbols that may indicate a query based exchange, expressions of gratitude and/or indications of helpfulness and/or favorability. In some embodiments, the content terminology data 104 may include a computer-implemented intelligent agent that may be based on evolutionary computation concepts such as artificial intelligence and/or neural networks among others.

Once the communications analyzer 102 has identified a query based exchange and/or helpful message that includes some indication of favorability, which may be favorable or unfavorable, a favorability response module 106 may determine how to respond. For example, in the context of communications between a client and/or customer and a service provider, if an unfavorable indication is determined, the messages and/or an alert may be sent to a nonparticipant 20, such as a supervisor or other support staff. In some embodiments, the nonparticipant 20 may provide an intervening message in an effort to improve the favorability in the exchange, such as, for example, by providing additional information that may be helpful.

Some embodiments provide that the favorability response module 106 may provide favorability data and/or messages including favorability indications to the content terminology data 104 to provide updates and/or subsequent training thereto. For example, messages that include indications of gratitude responsive to helpful messages from another participant 10 may be evaluated to determine if any additional words, terms, phrases and/or symbols should be included in the content terminology data 104.

The favorability response module 106 may provide favorability data and/or messages including favorability indications to a communication modifiers 110 which may modify the routing and/or delivery of future messages based on the favorability data. For example, where a participant 10 is associated with providing helpful messages in the context of a specific subject matter, future queries and/or requests for information may be routed to that participant 10. Similarly, where participant 10 is associated with providing particularly unhelpful or unfavorable responses, future queries and/or requests for information may be specifically not sent or delivered to that participant 10.

A participant data modifier 112 may receive information from the favorability response module 106 and modify data corresponding to a participant 10 based on content and/or the reaction to content provided in a message from that participant 10. For example, participant data may include a helpfulness data value that may be associated with each participant 10. The specific participant's helpfulness data value may be modified in response to the participant 10 being associated with a message that is identified as being helpful. Some embodiments provide that the helpfulness data value may be incremented each time a helpful message is associated with the respective participant 10. In some embodiments, participant data may include content and/or subject matter corresponding to specific topics and/or subjects in which a helpful message was provided. For example, helpfulness data corresponding to a participant 10 may indicate particularly helpful responses corresponding to, for example, automobiles. In that regard, the participant data may reflect a high helpfulness data value on the subject of automobiles.

Some embodiments provide that the participants 10 may be provided advance notice that helpfulness in communications is being analyzed. In this manner, some participants 10 may be further motivated to provide helpful messages and/or favorable content.

In the context of a client and/or customer and a service provider, some embodiments provide that the participant data modifier 112 modifies a performance metric of the service provider based on favorability data from the favorability response module 106. For example, if the favorability response module 106 detects that a communication between a client and a concierge is particularly favorable, then the participant data modifier 112 may increment a performance metric associated with that concierge, which may reflect positive job performance. Similarly, if the favorability module 106 detects that a communication between the client and concierge is particularly unfavorable, then the participant data modifier 112 may decrement a performance metric associated with that concierge, which may reflect negative job performance.

Some embodiments provide that favorability data storage 108 may be configured to store favorability data. The stored favorability data may include participant data, substantially complete and/or redacted raw favorability data, data values determined from favorability data, and/or statistical data derived from favorability data, among other things.

Use Case Example

Group of Participants

Figure 2:
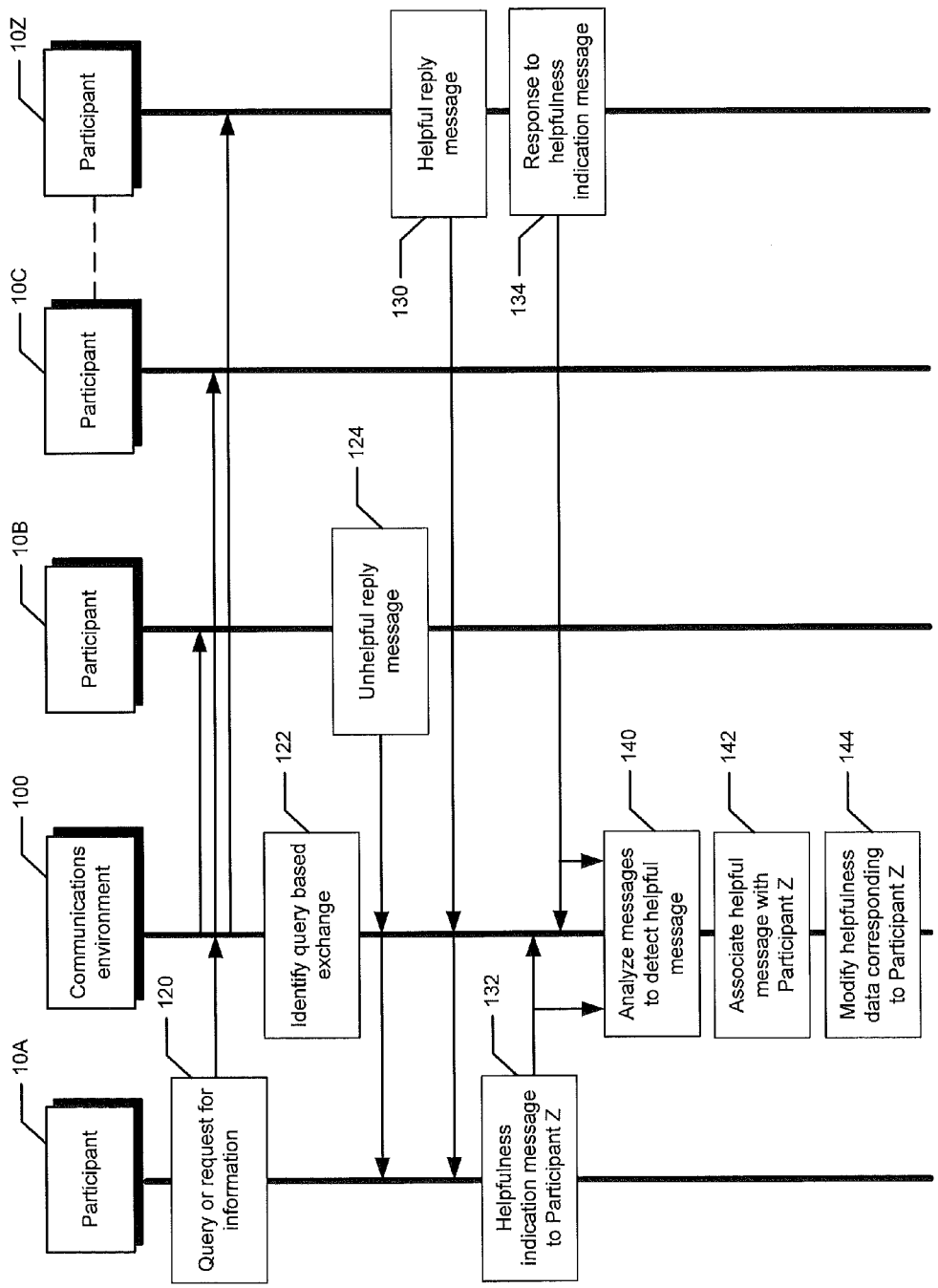
FIG. 2 is a diagram of operations and associated message flows that may be performed by various elements disclosed herein to detect contributory communications in an open communications environment for multiple participants according to some embodiments described herein.

Reference is now made to FIG. 2, which is a diagram of operations and associated message flows that may be performed by various elements disclosed herein to detect contributory communications in an open communications environment 100 for multiple participants according to some embodiments described herein. The communications environment 100 may facilitate communications between multiple participants 10A-10Z. In some embodiments, the communications environment 100 may include a computer-based resource such as a weblog, online bulletin board, and/or online forum for participants to post comments and/or questions.

Participant 10A may send and/or post a message including a query and/or a request for information 120. The communications environment 100 may deliver and/or make the message accessible to other ones of the participants 10B-10Z. In some embodiments, the communications environment 100 may identify the exchange of messages as a query based exchange (block 122). Once the exchange is identified as a query based exchange, the communications environment 100 may analyze the messages therein to detect helpful messages (block 140). In some cases one or more unhelpful messages 124 may be sent and/or posted. Such messages may be determined as not including helpful content and thus may not be considered regarding any subsequent actions.

In the present example, participant 10Z may provide a helpful reply message in response to the query (block 130). In such cases, participant 10A may respond to the helpful message from participant 10Z with an indication that the message was helpful (block 132). Indications that the message was helpful may include, for example, terms of gratitude and/or appreciation, such as, "Thanks", "Thank you", "Great", "Super", etc. Such terms may be used to detect the helpful reply message.

In some embodiments, helpful messages may be detected based on a response to an indication that a message was helpful (block 134). For example, in response to participant 10A's indication that the message from participant 10Z was helpful, participant 10Z may respond using a typical response to gratitude such as "You're welcome", "Glad to help", "No problem", etc. Such terms may be used to detect the response to the indication that the previously provided response was helpful. As such, helpful messages may be detected via multiple different ones of the messages.

Once a helpful message is detected (block 140), the helpful message may be associated with the corresponding participant (block 142). In the current example, the helpful reply message 130 may be associated with participant 10Z. Helpfulness data corresponding to the helpful participant may be modified in response to associating the helpful message therewith (block 144). In the current example, helpfulness data corresponding to participant 10Z is updated. Some embodiments provide that the helpfulness data may include a helpfulness data value that may modified and/or incremented. In some embodiments, the helpfulness data may be modified to include additional information, including, for example, content and/or subject matter regarding participant 10Z's helpfulness. In this manner, participants that are generally helpful to other participants may be identified as such.

Use Case Example

Point-to-Point Intervening Nonparticipant

Figure 3:
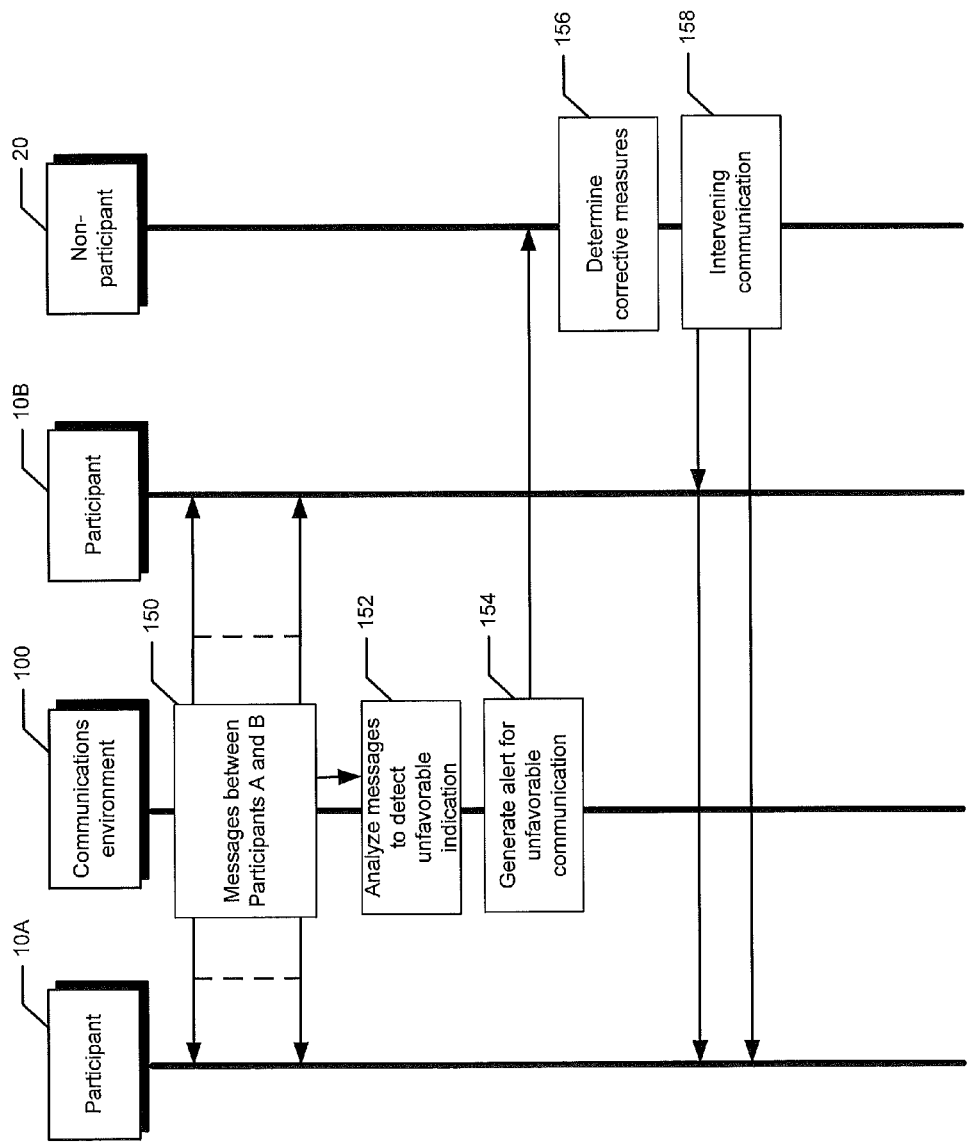
FIG. 3 is a diagram of operations and associated message flows that may be performed by various elements disclosed herein to detect unfavorable indications in communications in a point-to-point communications environment according to some embodiments described herein.

Reference is now made to FIG. 3, which is a diagram of operations and associated message flows that may be performed by various elements disclosed herein to detect unfavorable indications in communications in a point-to-point communications environment according to some embodiments described herein. Some embodiments provide that the communications environment 100 may provide point-to-point communications that may include multiple messages between specific participants 10A and 10B (block 150), such as, for example, those used between a client and/or customer and a service provider. Examples of such arrangements include, but are not limited to a customer service role, a technical support role, and/or a concierge service, among others. In this regard, the communications environment 100 may include text based communications via one or more computing devices and/or voice based communications using a variety of telephony equipment that may be integrated into, routed through, coupled with and/or monitored by the communications environment 100. In the case of voice communications, some embodiments may further include a voice to text converter (not shown) and/or a voice content analyzer to determine content of the communications.

The communications environment 100 may be configured to analyze messages to detect an unfavorable indication (block 152) in the exchange. Unfavorable indications may include expression of frustration, anger, irritation, elevated speaking volumes, words, terms, phrases and/or symbols indicating an unfavorable mood and/or tone, among others. Additionally, expressions of apologies and/or regrets may provide evidence of an unfavorable indication. For example, an unfavorable indication may occur in the case of a technical support provider unsatisfactorily serving a customer, where the customer becomes increasingly frustrated with the inability of the technical support provider to assist the customer.

Once an unfavorable indication is detected, an alert corresponding to the unfavorable communication may be generated (block 154). The alert may be sent, provided to and/or posted for a nonparticipant 20 in the exchange. Some embodiments provide that the nonparticipant 20 may include a supervisor, monitoring agent, supplemental support personnel, among others. In some embodiments, the nonparticipant 20 may include a program that is operable to provide automatic analysis and/or an automatically generated response to an alert. Additionally, some embodiments provide that the nonparticipant 20 is associated with a third party that may or may not be associated with the participants 10A and 10B. The nonparticipant 20 may analyze some or all of the messages between the participants in response to the alert and may determine corrective measures (block 156). For example, in the above described technical support context, the nonparticipant 20 may include another technical support individual that may be able to determine a resolution for an issue that the technical support participant 10 has been unsuccessful in resolving. In this regard, the nonparticipant 20 may send and/or post an intervening communication to one or both of the participants 10 with additional information (block 158). Some embodiments provide that the intervening communication may be sent to either one or both of the participants 10A and 10B. For example, in the technical support context, the intervening communication may be sent to the technical support participant 10, who may then use the intervening communication to further advance resolution of the problem and/or may send applicable portions of the intervening communication to the customer participant 10. In some embodiments, the nonparticipant 20 may be a customer service representative that can authorize concessions to a client and/or customer, such as, for example, discounts, waivers, and/or other offerings that may alter the unfavorable indication of the exchange. In this manner, a potentially unfavorable exchange between participants 10A and 10B may be converted into a favorable or less unfavorable exchange.

Use Case Example

Point-to-Point Nonintervening Nonparticipant

Figure 4:
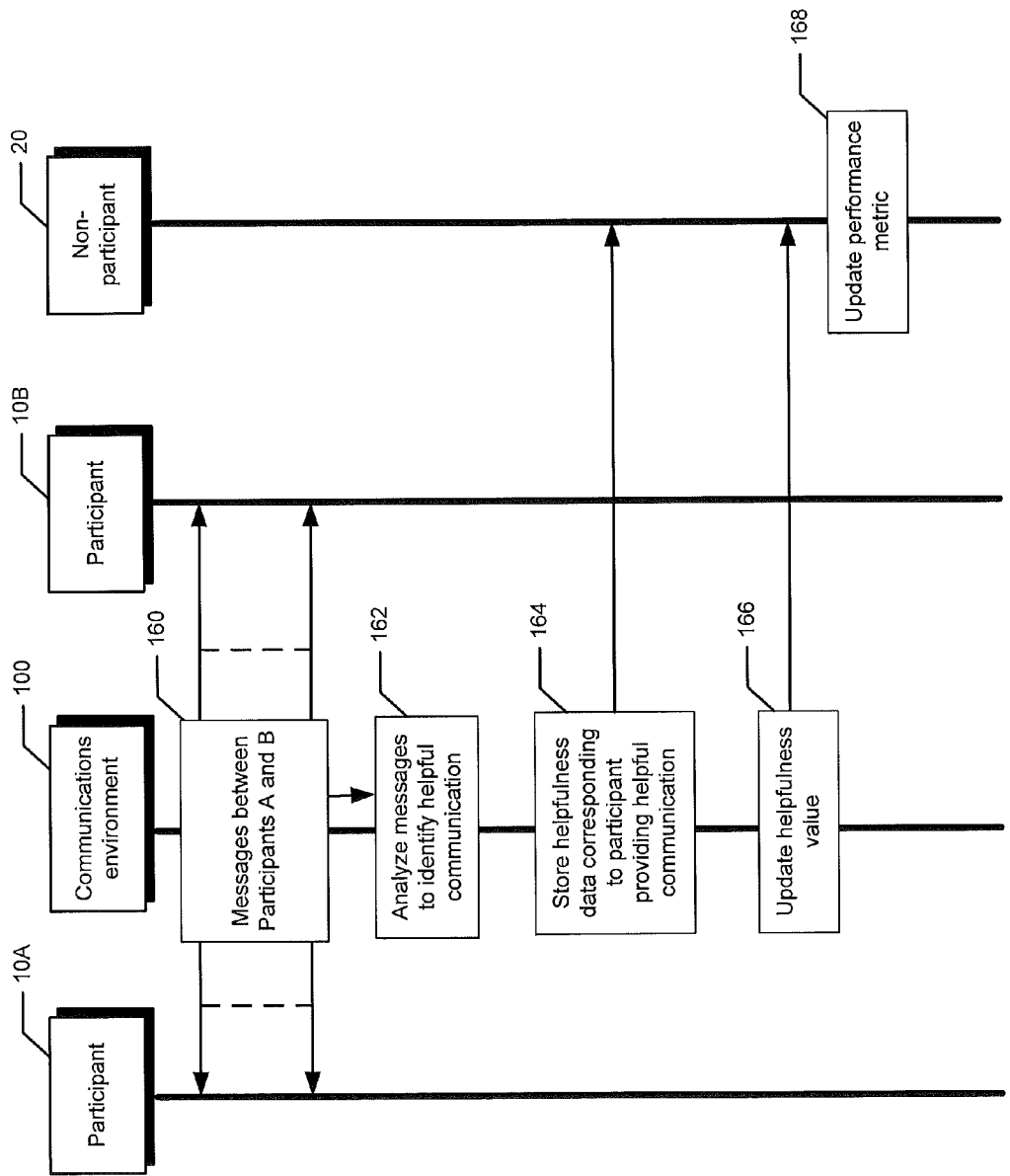
FIG. 4 is a diagram of operations and associated message flows that may be performed by various elements disclosed herein to detect unfavorable indications in communications in a point-to-point communications environment according to some embodiments described herein.

Reference is now made to FIG. 4, which is a diagram of operations and associated message flows that may be performed by various elements disclosed herein to detect unfavorable indications in communications in a point-to-point communications environment according to some embodiments described herein. The communications environment 100 and participants 10A and 10B may be similar to those described above regarding FIG. 3 and thus duplicate discussion thereof may be omitted. In some embodiments, the communications environment 100 may analyze the messages between participants 10A and 10B to identify a helpful communication (block 162). As described herein, a helpful communication may be any one particular type of a variety of types of favorable communications.

Once a helpful communication is identified, the helpfulness data corresponding to the helpful communication may be stored corresponding to the participant 10B providing the helpful communication (block 164). Helpfulness data may include the subject of the helpful communication and an identity and/or class of the other participant 10A. In some embodiments, a helpfulness value corresponding to the participant 10B may be updated (block 166). Additionally, some embodiments provide that a nonparticipant 20 may receive the helpfulness data and/or the updated helpfulness value. For example, in the context of a customer and/or client communicating with a service provider, the helpfulness data and/or the updated helpfulness value may be used by a non-participant 20 in a supervisory role to update a job performance metric (block 168). In some embodiments, the communications environment 100 may include an informational resource such as, for example, a question and answer repository that may receive questions and answers responsive thereto. The repository may be provide answers and/or identify resources such as participants 10 who have been helpful, generally and/or regarding a specific context. In such cases, updating the performance metric may provide information regarding which of the participants may be the most likely to provide helpful responses to subsequently asked questions. In this manner, participants 10 may realize additional benefits from being helpful in communications with other participants 10.

Query Based Exchange

Figure 5:
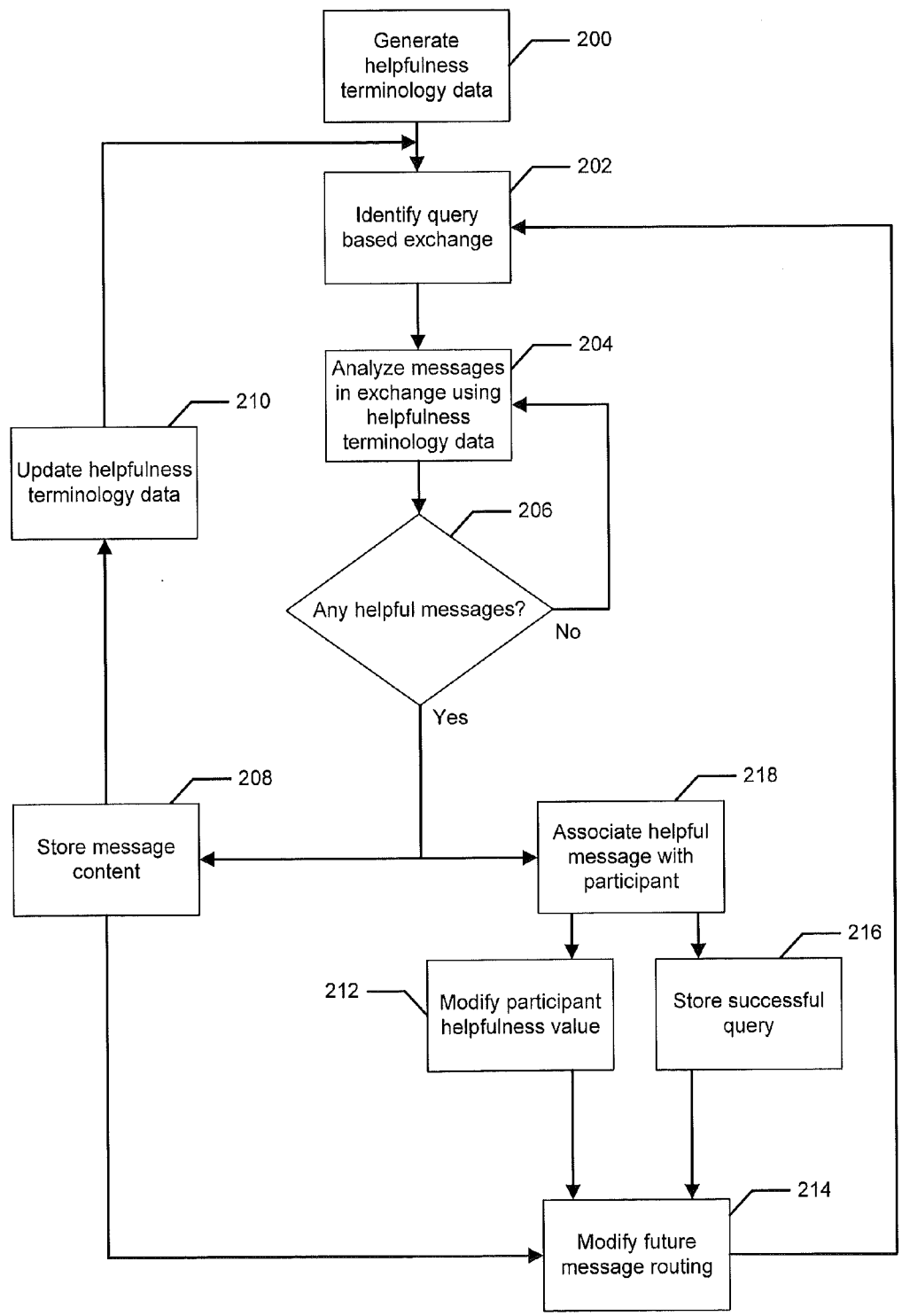
FIG. 5 is a flowchart of operations that may be performed to detect helpful messages in communications in a communications environment according to some embodiments described herein.

Reference is now made to FIG. 5, which is a flowchart of operations that may be performed to detect helpful messages in communications in a communications environment according to some embodiments described herein.

Operations may include generating helpfulness terminology data that corresponds to expressions and/or indications of helpfulness (block 200). In some embodiments, helpfulness terminology data may include words, terms, phrases and/or symbols that correspond to an expression of helpfulness and or a response to an expression of helpfulness. For example, an expression of gratitude and/or a response thereto may signal that a helpful message was provided. Some embodiments provide that the helpfulness terminology data includes a helpfulness terminology library and/or database that includes the words, terms, phrases and/or symbols. In some embodiments, the helpfulness terminology data includes a computer-implemented intelligent agent that may be trained to detect the helpful message using an initial training set of helpfulness data. Whether implemented as a helpfulness library, database or intelligent agent, the helpfulness terminology data may be updated using subsequently identified helpful messages and/ or exchanges including such messages.

Some embodiments provide that the helpfulness terminology data may be used to identify query based exchanges of messages between participants in a communications environment (block 202). In some embodiments, the helpfulness terminology data may further include terminology that may be used to identify a query based exchange. For example, words, terms and/or phrases such as "Does anyone know . . . ?", "How do you . . . ?", "Where is a . . . ?", "When are . . . ?", etc. may indicated a query based exchange. In some embodiments, substantially all messages and/or exchanges of messages between participants in a communications environment may be analyzed for helpfulness expressions or responses thereto and thus identifying query based exchanges may not be performed.

The messages in an exchange may be analyzed using the helpfulness terminology data to identify helpful messages (block 204). As described above, helpful messages may be identified by subsequent messages including expressions of appreciation and/or gratitude and/or responses thereto. A determination is made as to whether there are helpful messages (block 206). If no helpful messages are identified, the messages and/or exchange of messages may continue to be analyzed (block 204).

Once identified, the helpful message may be associated with a source participant that provided the message (block 218). In some embodiments, the exchange in which the message was provided may also be associated with the source participant. A participant helpfulness value corresponding to the source participant may be modified to reflect the helpful message associated therewith (block 212). Some embodiments provide that the participant helpfulness value may be a general value that may be, for example, incremented responsive to new helpful messages being associated with the source participant. In some embodiments, the participant helpfulness value may include content and/or subject matter corresponding to areas in which the source participant has been helpful. In this manner, some participants may be identified as favorable resources for queries corresponding to specific subject matter.

In some embodiments, a successful query and/or portions of the exchange in which the query occurred may be stored (block 216). By storing the query and/or related exchange, historical data may be accumulated that may be used in reference to future queries and/or other information requirements. Based on the modified participant helpfulness value and/or the successful query data stored, future message routing may be modified (block 214). For example, questions regarding a specific topic in which a participant has been particularly helpful may be preferentially routed to that participant.

Some embodiments provide that once helpful messages are identified, the message content and/or content of related messages may be stored (block 208). The stored message content may be used to update helpfulness terminology data (block 210). For example, new expressions of gratitude or appreciation may develop that may be beneficial in identifying helpful messages and/or expressions of gratitude responsive thereto.

Helpfulness Terminology Data

Figure 6:
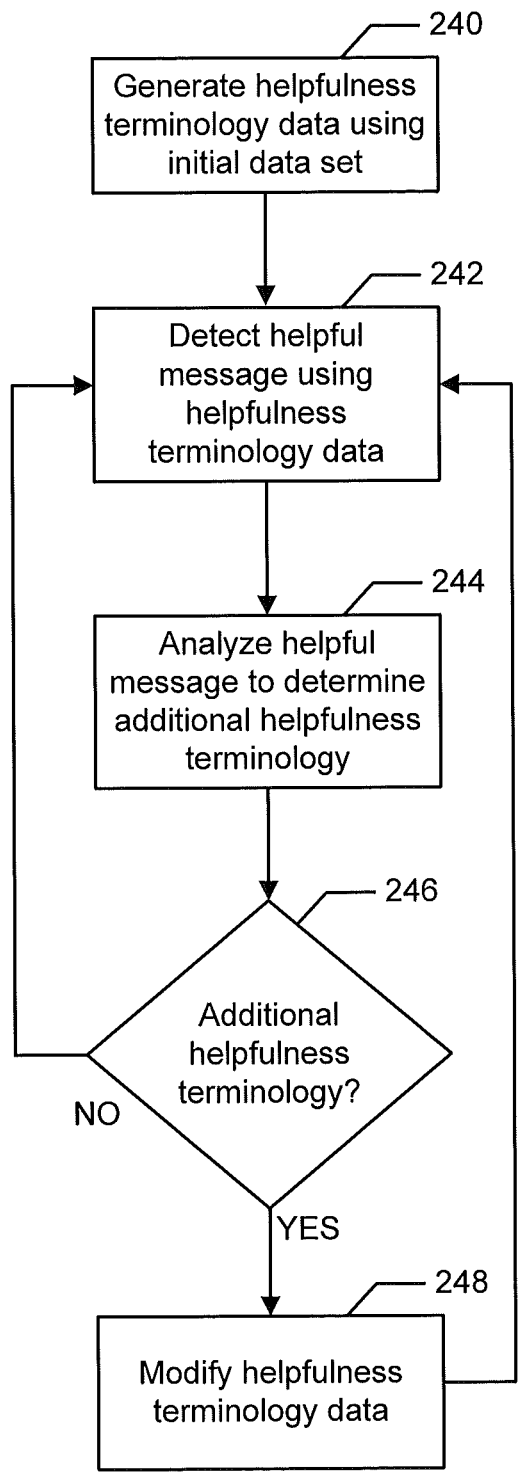
FIG. 6 is a flowchart of operations that may be performed to provide helpfulness terminology data according to some embodiments described herein.

Reference is now made to FIG. 6, which is a flowchart of operations that may be performed to provide helpfulness terminology data according to some embodiments described herein. The helpfulness terminology data may be generated using an initial data set (block 240). The initial data set may include a list of estimated helpfulness terminology and/or a training set of helpfulness terminology data. The helpfulness terminology data may includes words, terms, phrases and/or symbols that indicate helpful messages and/or responses thereto. The helpfulness terminology data may include weights and/or values corresponding to the words, terms, phrases and/or symbols or combinations thereof.

As described above, the helpfulness terminology data may be used to detect helpful messages (block 242). The helpful messages may be analyzed to determine additional, new, modified and/or evolved helpfulness terminology data relative to the existing terminology data (block 244). Whether additional helpfulness terminology is present is determined (block 246). If no additional helpfulness terminology is present, then the existing helpfulness terminology data is used to continue to detect helpful messages (block 242). If additional helpfulness terminology is present, then the helpfulness terminology data is modified (block 248). The modified helpfulness terminology data may be used to detect helpful messages (block 242). In this manner, as the language evolves the helpfulness terminology data may develop accordingly. Additionally, some groups or participants having common interests and/or expertise may have culturally distinct expressions including those corresponding to gratitude and/or helpfulness. As such, the helpfulness terminology data may develop to recognize such culturally distinct expressions.

System Embodiments

Figure 7:
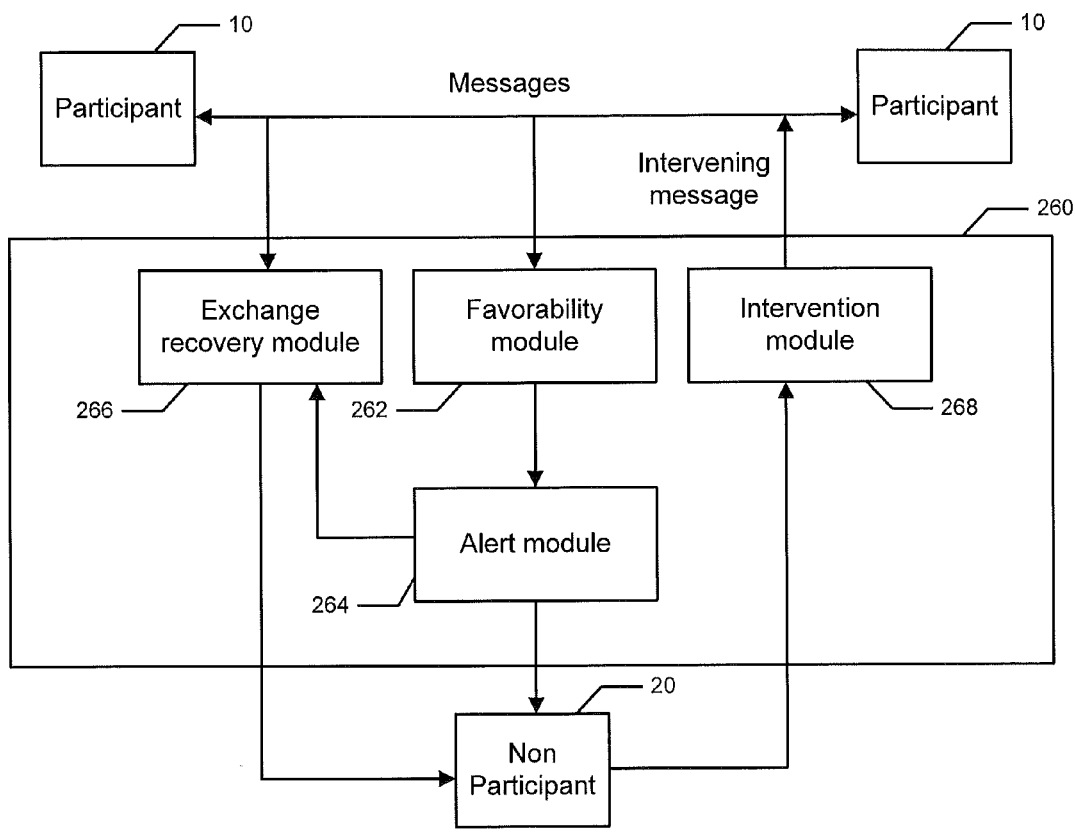
FIG. 7 is a block diagram of a system for supplementing a communications exchange between multiple participants according to various embodiments described herein.

Reference is now made to FIG. 7, which is a block diagram of a system 260 for supplementing a communications exchange of messages between multiple participants 10 according to various embodiments described herein. The communications exchange may include multiple communication messages that include real-time text based messages between the participants 10. In some embodiments, the communication messages include voice communications between the participants 10. In such embodiments, the system 260 may optionally include a speech-to-text conversion module (not shown) that is operable to convert the speech in the voice communications to text.

The system 260 may include a favorability module 262 that is configured to analyze communication messages in the communications exchange between the participants 10. The communication favorability module 262 may generate an unfavorable indication corresponding to the communication exchange being unfavorable for one of the participants 10. The unfavorable indication may be sent to an alert module 264 that is configured to generate an alert corresponding to the unfavorable communications indication. The alert may be sent to a nonparticipant 20 in the communications exchange. For example, the participants 10 may include a service provider representative and a customer and/or client and the nonparticipant may include another representative from the service provider. If the favorability module 262 detects that the communications exchange is becoming unfavorable for the customer and/or client, then the alert module may generate an alert to the other service provider representative (nonparticipant 20). The nonparticipant 20 may then access a portion of or all of the communications exchange via an exchange recovery module 266. In this manner, the nonparticipant 20 may be able to determine a corrective measure regarding the unfavorable indication.

In some embodiments, the system 260 includes an intervention module 268 that is configured to provide the nonparticipant 20 with communicative access to the participants 10. For example, the corrective measure may include an intervening communication that includes additional information or content corresponding to the unfavorable indication.

Miscellaneous Embodiments

Figure 8:
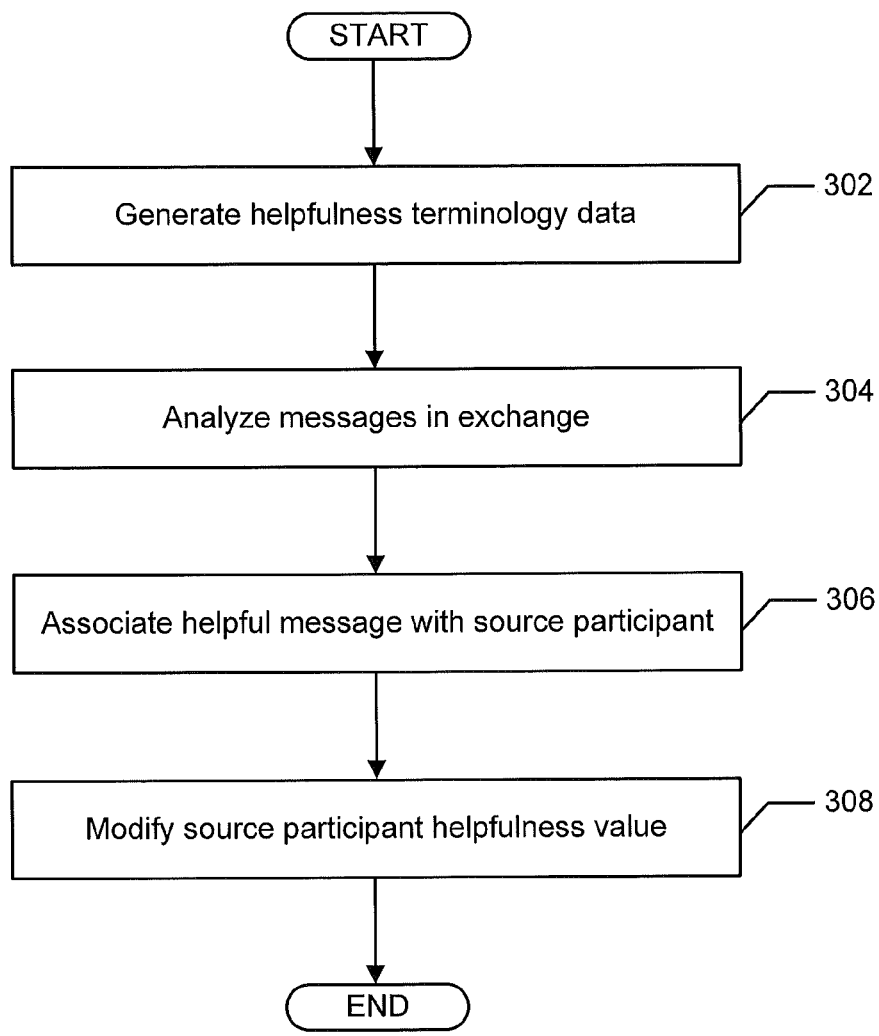
FIG. 8 is a flowchart of operations that may be performed to detect helpful query responses in a communications environment according to some embodiments described herein.

Reference is now made to FIG. 8, which is a flowchart of operations that may be performed to detect helpful query responses in a communications environment according to some embodiments described herein. Operations may include generating helpfulness terminology data corresponding to words, terms, phrases and/or symbols that correspond to expressions responsive to a helpful message (block 302). In some embodiments, helpfulness data may include a helpfulness terminology library and/or database that includes the words, terms, phrases and/or symbols. Some embodiments provide that the helpfulness data includes a computer-implemented intelligent agent that is configured to learn to detect the helpful message based on an initial training set of helpfulness data. Whether implemented as a library, database, or intelligent agent, the helpfulness terminology data may be updated or trained using messages in an exchange of messages that includes the helpful message. For example, messages related to the helpful message may include additional helpfulness terminology.

Using the helpfulness terminology data, multiple messages in a communications environment may be analyzed to detect a helpful message that is responsive to query from a communications environment participant (block 304). Some embodiments provide that a helpful message may be detected based on responses to the helpful message. For example, expressions of gratitude to a participant may signal that the participant has provided a helpful message. In the context of library and/or database implemented helpfulness terminology, the plurality of messages may be compared and/or parsed to detect the helpful messages. In the context of an intelligent agent, the plurality of messages may be analyzed using automated information analysis methods.

The helpful message may be associated with a participant who provided the helpful message (block 306). In some embodiments, a helpfulness value that corresponds to the source participant may be modified based on the helpful message (block 308). For example, the helpfulness value may be incremented responsive to the helpful message being associated with the source participant. In some embodiments, the helpfulness value may include multiple values that correspond to different subject matter such that the source participant may have a very high helpfulness value in one subject area and a much lower helpfulness value in another subject area. In this manner, known expertise, or lack thereof, among participants may be known and used to modify which types of questions or queries are sent to which participants.

Figure 9:
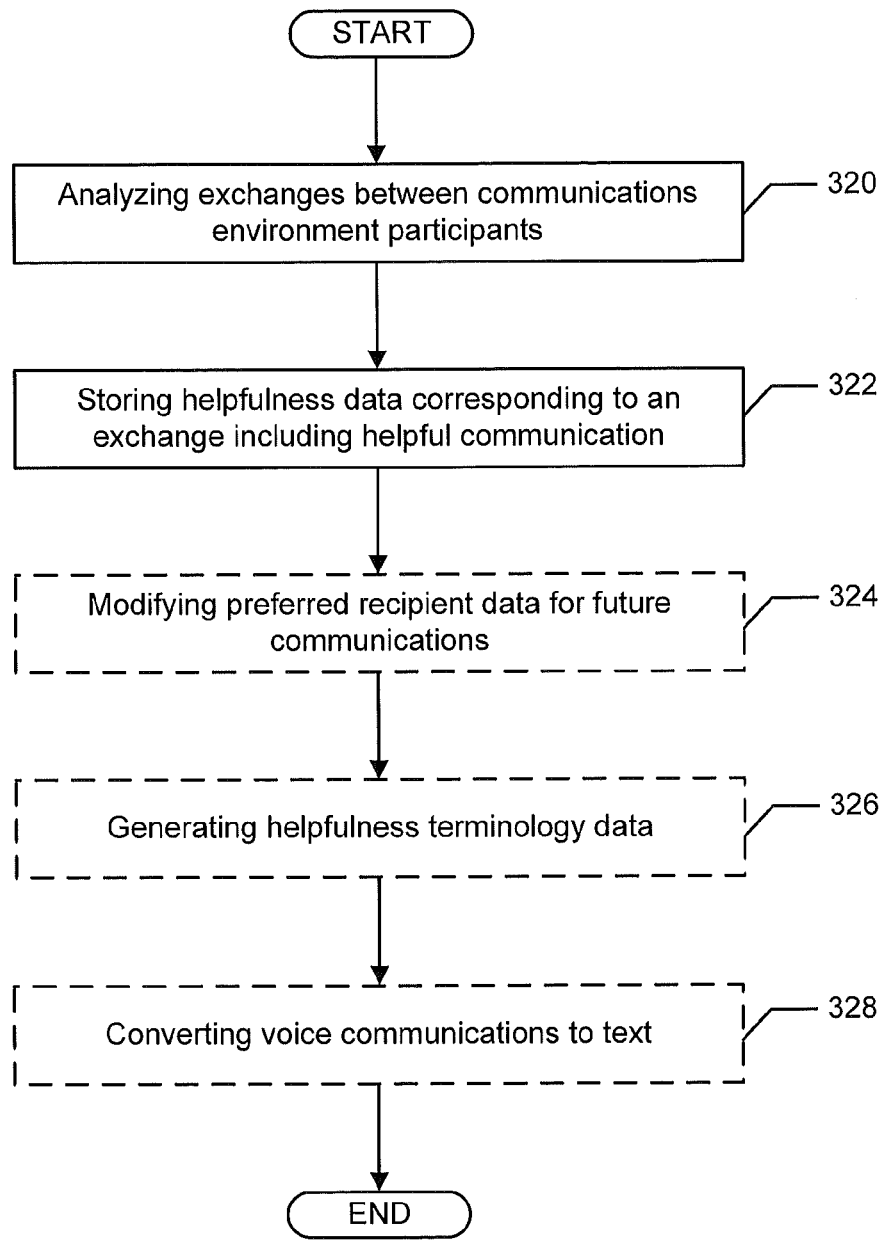
FIG. 9 is a flowchart of operations that may be performed to detect contributory communications in a communications environment according to some embodiments described herein.

Reference is now made to FIG. 9, which is a flowchart of operations that may be performed to detect contributory communications in a communications environment according to some embodiments described herein. Operations may include analyzing multiple exchanges between participants in a communications environment to identify a helpful communication and/or a response thereto (block 320). Some embodiments provide that the communications environment includes a text based communications environment such as a computer implemented communications environment in which exchanges between participants may be delayed and/or real-time. In some embodiments, the communications environment may provide that exchanges include voice communications between the participants. In such environments, analyzing the exchanges may include analyzing the voice communications to identify the helpful communication and/or the response thereto. Some embodiments may optionally include converting the voice communications to text communication before analyzing the exchanges (block 328).

Operations may include storing helpfulness data corresponding to exchanges that are identified as including the helpful communication (block 322). For example, the helpful communication and/or messages associated therewith may be stored for future reference. In some embodiments, the helpful data may include a helpfulness value that is associated with the participant that provided the helpful communication. In this regard, storing the helpfulness data may include incrementing the helpfulness value corresponding to the participant providing the helpful communication. Some embodiments provide that content corresponding to the helpful communication may be stored. The content corresponding to the helpful communication may be associated with the participant to indicate that the participant was helpful regarding that specific content.

Some embodiments provide that one of the participants is a service provider representative and another of the participants is a customer. In this context, the helpfulness value may be a service performance indicator that is associated with the service provider representative.

Operations may optionally include modifying preferred recipient data for future communications (block 324). Some embodiments provide that the relative frequency with which a communication is routed to a particular participant may be modified based on the helpfulness value that is associated with that participant. For example, the frequency with which a communication is routed to a participant may be positively correlated to the helpfulness values associated with that participant. In this manner, a particularly helpful participant as identified by a high helpfulness value may receive communications at a higher frequency than a particularly unhelpful participant as identified by a low helpfulness value.

In some embodiments, modifying preferred recipient data may include providing a content identifier corresponding to helpfulness values. In this manner, a content identifier may be used to identify a participant as being particularly helpful regarding a specific subject matter. For example, a participant who has provided helpful communications regarding electronic equipment may be identified as a preferred recipient of future questions regarding electronic equipment.

Operations may optionally include generating helpfulness terminology data corresponding to words, terms, phrases and/or symbols that correspond to an expression responsive to helpfulness (block 326). For example, in response to a helpful message, the source participant of the helpful message may receive a message of gratitude and/or appreciation. In this regard, the helpfulness terminology data may include terminology corresponding to the expressions of gratitude, such as, for example, "Thanks" and/or "Thank you", among others. Additionally, the helpfulness terminology data may include terminology corresponding to typical replies to expressions of gratitude, such as, for example, "You're welcome", among others. The helpfulness terminology data may be used to analyze the exchanges and/or communications to identify the helpful communication.

Some embodiments provide that generating helpfulness terminology data (block 326) may include using an initial data set to generate the helpfulness terminology data and then updating the helpfulness terminology data using content of the exchanges and/or communications that are identified as including and/or associated with the helpful communication. In some embodiments, the helpfulness terminology data may include words, terms, phrases and/or symbols that correspond to the expression of helpfulness and values that correspond to the words, terms, phrases and/or symbols. In this manner, the strength of helpfulness indication may be provided corresponding to different ones of the words, terms, phrases and/or symbols.

Various embodiments have been described fully herein with reference to the accompanying figures, in which various embodiments are shown. This disclosure may, however, be embodied in many alternate forms and should not be construed as limited to the embodiments set forth herein.

Accordingly, while the disclosure is susceptible to various modifications and alternative forms, specific embodiments thereof are shown by way of example in the drawings and were described in detail herein. It should be understood, however, that there is no intent to limit the disclosure to the particular forms disclosed, but on the contrary, the disclosure is to cover all modifications, equivalents, and alternatives falling within the spirit and scope of the disclosure as defined by the claims. Like numbers refer to like elements throughout the description of the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," "including," "have," "having" or variants thereof when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s)

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the disclosure and, although specific terms are employed, they are used in a generic and descriptive sense only and not for purposes of limitation, the scope of the disclosure being set forth in the following claims.

The invention claimed is:

1. A computer implemented method for detecting helpful messages, the method comprising:
generating helpfulness terminology data that corresponds to responses to a helpful message, wherein the helpfulness terminology data comprises a helpfulness terminology library that includes a plurality of words, terms, phrases or symbols, wherein generating the helpfulness terminology data comprises generating the helpfulness terminology data using an initial data set;
analyzing a plurality of messages using the helpfulness terminology data to detect the helpful message, wherein the helpful message is responsive to a message sent by a first participant among a plurality of communications environment participants, the helpful message being sent by a second participant among the plurality of communications environment participants;
associating the helpful message with the second participant;
establishing a helpfulness value associated with the second participant, the helpfulness value being based on at least the responses to the helpful message and an analysis of the helpfulness terminology data;
modifying the helpfulness value associated with the second participant in response to a second helpful message being associated with the second participant; and
updating the helpfulness terminology data using content of the ones of the plurality of messages that are identified as including the helpful message.

2. The method according to claim 1, wherein analyzing the plurality of messages comprises comparing the plurality of messages to the plurality of words, terms, phrases or symbols in the helpfulness terminology library.

3. The method according to claim 1, wherein generating helpfulness terminology data comprises training a computer-implemented intelligent agent that is configured to learn to detect the helpful message by using an initial training set of helpfulness data.

4. The method according to claim 1, further comprising updating the helpfulness terminology data using messages in an exchange of messages that includes the helpful message.

5. The method according to claim 1, wherein modifying the helpfulness value associated with the second participant comprises:
determining content corresponding to a subject of the helpful message; and
modifying the helpfulness value to include the content to identify that the second participant provided the helpful message corresponding to the content.

6. A computer implemented method for detecting helpful communications, the method comprising:
generating helpfulness terminology data that corresponds to responses to a helpful communication, wherein the helpfulness terminology data comprises a helpfulness terminology library that includes a plurality of words, terms, phrases or symbols and wherein generating the helpfulness terminology data comprises generating the helpfulness terminology data using an initial data set, the method further comprising updating the helpfulness terminology data using content of individual ones of a plurality of exchanges that are identified as including the helpful communication;
analyzing the plurality of exchanges between a plurality of participants in a communications environment to identify at least one of the helpful communication and a response thereto, the helpful communication being sent by a helpful participant among the plurality of participants;
associating the helpful participant with the helpful communication;
establishing a helpfulness value associated with the helpful participant, the helpfulness value being based on at least the responses to the helpful communication and an analysis of the helpfulness terminology data; and
adjusting the helpfulness value associated with the helpful participant in response to associating the helpful participant with a second helpful communication.

7. The method according to claim 6, wherein adjusting the helpfulness value associated with the helpful participant comprises incrementing the helpfulness value corresponding to the helpful participant in response to associating the helpful participant with the helpful communication.

8. The method according to claim 6, further comprising modifying a preferred recipient data that determines relative frequencies of sending a plurality of future communications to at least one of the plurality of participants, wherein the frequencies are positively correlated to the helpfulness value of respective ones of a plurality of recipients.

9. The method according to claim 8, wherein modifying the preferred recipient data comprises providing a content identifier corresponding to a greater helpfulness value.

10. The method according to claim 7, wherein the at least one of the plurality of participants is a service provider representative and another of the plurality of participants is a customer, and wherein the helpfulness value is a service performance indicator corresponding to the service provider representative.

11. The method according to claim 6, wherein the helpfulness terminology data includes the plurality of words, terms, phrases or symbols that correspond to an expression of helpfulness and a plurality of values that correspond to respective ones of the words, terms, phrases or symbols, the plurality of values corresponding to a plurality of relative helpfulness weights of the words, terms, phrases or symbols.

12. The method according to claim 6, wherein the plurality of words, terms, phrases or symbols that correspond to an expression of helpfulness include expressions of gratitude and responses to expressions of gratitude.

13. The method according to claim 6, wherein the plurality of exchanges include text-based exchanges that are configured to be performed in at least one of a real-time sequence or a non real-time sequence.

14. The method according to claim 6,
wherein the plurality of exchanges include voice communications between the plurality of participants, and
wherein analyzing the plurality of exchanges comprises analyzing the voice communications to identify the helpful communication or the response thereto.

15. The method according to claim 6, wherein the plurality of exchanges include voice communications between the plurality of participants, and before analyzing the plurality of exchanges, further comprising converting the voice communications to text communications.

16. The method according to claim 6, wherein analyzing the plurality of exchanges comprises comparing the plurality of exchanges to the plurality of words, terms, phrases or symbols in the helpfulness terminology library.

17. The method according to claim 6, wherein generating helpfulness terminology data comprises training a computer-implemented intelligent agent that is configured to learn to detect the helpful communication by using an initial training set of helpfulness data.

18. The method according to claim 6, further comprising updating the helpfulness terminology data using communications in an exchange of communications that includes the helpful communication.

19. The method according to claim 6, wherein adjusting the helpfulness value associated with the helpful participant comprises:
determining content corresponding to a subject of the helpful communication; and
adjusting the helpfulness value to include the content to identify that the helpful participant provided the helpful communication corresponding to the content.

20. A computer program product for detecting helpful query responses, the computer program product comprising a non-transitory computer-readable medium having computer-readable program code executable by a computer, the computer-readable program code comprising:
first computer-readable program code that is configured to generate helpfulness terminology data that corresponds to responses to a helpful message, wherein the helpfulness terminology data comprises a helpfulness terminology library that includes a plurality of words, terms, phrases, or symbols and wherein generating the helpfulness terminology data comprises generating the helpfulness terminology data using an initial data set, the first computer-readable program code being further configured to update the helpfulness terminology data using content of individual ones of a plurality of messages that are identified as including the helpful message;
second computer-readable program code that is configured to analyze the plurality of messages between a plurality of communications environment participants to detect the helpful message, the helpful message identified as being provided by a source participant of the plurality of communications environment participants and helpful to at least another one of the plurality of communications environment participants;
third computer-readable program code that is configured to associate the helpful message with the source participant of the plurality of communications environment participants;
fourth computer-readable program code that is configured to establish a helpfulness value that corresponds to the source participant responsive to associating the helpful message with the source participant; and
fifth computer-readable program code that is configured to update the helpfulness value that corresponds to the source participant responsive to associating a second helpful message with the source participant.

21. A computer program product according to claim 20, wherein the second computer-readable program code comprises comparing the plurality of messages to the plurality of words, terms, phrases or symbols in the helpfulness terminology library.

22. A computer program product according to claim 20, wherein the first computer-readable program code comprises training a computer-implemented intelligent agent that is configured to learn to detect the helpful message by using an initial training set of helpfulness data.

23. A computer program product according to claim 20, further comprising sixth computer-readable program code that is configured to update the helpfulness terminology data using messages in an exchange of messages that includes the helpful message.

\* \* \* \* \*